No. 756,134. PATENTED MAR. 29, 1904.
G. S. NEELEY.
GLASS WATER GAGE FOR STEAM BOILERS.
APPLICATION FILED JULY 27, 1903.

NO MODEL.

Witnesses
Alfred A. Eicks
M. Quin

Inventor
George S. Neeley
by Higdon & Longan & Hopkins Attys

No. 756,134. Patented March 29, 1904.

UNITED STATES PATENT OFFICE.

GEORGE S. NEELEY, OF ST. LOUIS, MISSOURI.

GLASS WATER-GAGE FOR STEAM-BOILERS.

SPECIFICATION forming part of Letters Patent No. 756,134, dated March 29, 1904.

Application filed July 27, 1903. Serial No. 167,132. (No model.)

*To all whom it may concern:*

Be it known that I, GEORGE S. NEELEY, a citizen of the United States, residing at St. Louis, State of Missouri, have invented certain new and useful Improvements in Glass Water-Gages for Steam-Boilers, of which the following is a specification containing a full, clear, and exact description, reference being had to the accompanying drawings, forming a part hereof.

My invention relates to glass water-gages for steam-boilers; and it consists in the novel construction hereinafter described and claimed.

Heretofore the contact of hot high-pressure steam with the upper end of the glass tube, through certain chemical changes, has eaten away or corroded the said glass tube both interiorly and exteriorly at and adjacent the upper stuffing-box, so that said glass has in many instances been worn away until it has become so attenuated as to be unable to longer withstand the pressure, and consequently has bursted because of the action of the steam as above described.

I am aware that rubber gaskets and other devices have heretofore been used for the purpose of preventing the steam from coming in contact with the exterior of the glass tube; but such devices are obviously ineffectual to protect the internal surface of the tube from the action of the hot steam.

The object of my invention is to provide an improved construction of the upper valve-casing of the water-gage whereby the hot steam will be prevented from coming in contact with the glass tube, and thereby obviate the objections above described.

Figure 1:
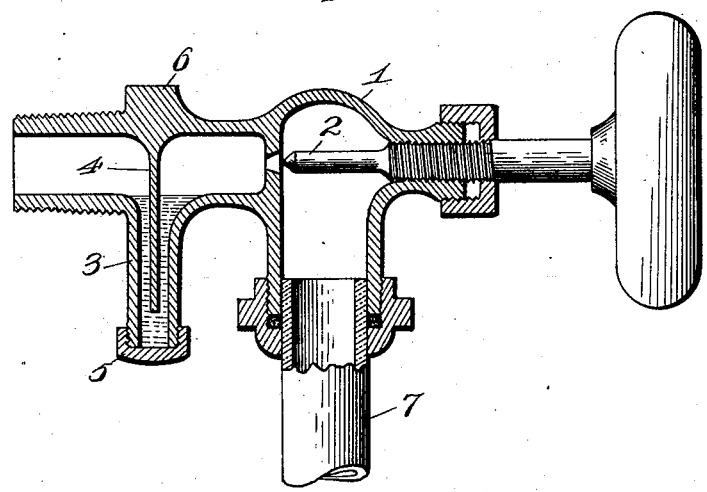
Figure 2:
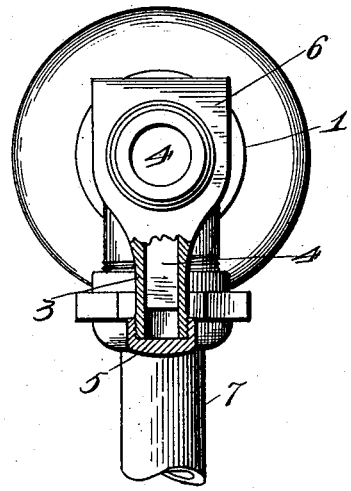

In the drawings, Figure 1 is a sectional side elevation of the upper end valve-casing having my invention applied thereto. Fig. 2 is a sectional end view of same.

In the drawings, 1 indicates the upper valve-casing, which is provided with the usual valve-stop 2 and is of the usual construction, with the exception that its inner end is provided with a trap 3, which projects from the lower side of said casing.

The interior trap 3 communicates with the interior of the casing 1, and depending from the upper wall of the casing is a partition 4, which projects downwardly within said trap to a point adjacent the lower end of the same and separates the upper portion of said trap into two divisions, but permits circulation of water beneath the free lower end of said partition 4.

The trap 3 and the partition 4 are preferably cast integral with the valve-casing, as shown; but these parts may of course be made separate, if so desired.

The lower end of the trap is preferably narrowed or tapered and is provided with a screw-threaded removable-cap 5, which may be detached at any time for the purpose of removing sediment from the trap.

The upper portion of the trap is preferably made angular in shape, as shown at 6, so that a wrench may be applied thereto for the purpose of screwing the casing into the threaded opening of the steam-boiler or water-column.

7 indicates the glass tube.

The operation is as follows: Upon opening the valve 2, as well as the water-valve, (not shown,) the water and steam will assume their usual relative positions within the glass tube 7; but the steam within the inner portion of the casing and within the trap 3 will soon condense sufficiently to fill the trap with water, as shown, and then any further circulation of steam will necessarily displace a portion of the water in said trap, which of course may be readily accomplished without causing any appreciable difference in pressure in the spaces upon both sides of the partition 4. The partition 4, having its lower end submerged in the water within the trap, acts to prevent the passage of the hottest steam to the glass tube and prevents the space within the casing at the upper end of the tube from becoming as hot as it otherwise would become. In fact, the space at the upper end of the tube within the casing has been found in actual operation to be filled with comparatively cool steam or air and such has had no appreciable deteriorating effect upon the glass tube. The trap and partition have therefore acted as a very effectual protection against the corrosion or wearing away of the upper end of the glass tube from the action of hot steam.

I have found in actual practice that the presence of the water of condensation in the trap does not appreciably alter the height of water in the glass, and therefore the accuracy of registration is not interfered with.

It will be understood that I do not limit myself to the exact construction herein shown and described, as the same may be varied within the limits of mechanical skill without departing from the spirit and scope of my invention.

What I claim is—

1. A glass water-gage for steam-boilers, having the glass tube in a vertical position, and a device upon the exterior of the boiler and adjacent the upper end of the glass tube for preventing contact of the hot steam with the said tube, substantially as described.

2. The improved glass-water-gage fitting, comprising a vertical glass tube a valve-casing, a valve, a stuffing-box, and a trap located essentially upon the exterior of the boiler and connected to said casing and adapted to prevent the continuous passage of hot steam to the glass tube, substantially as described.

3. The improved glass-water-gage fitting, comprising a valve-casing, a valve, a stuffing-box, and a trap connected to said casing and adapted to prevent the continuous passage of hot steam to the glass tube, said trap having a depending partition and a detachable cap at the lower end of said trap, substantially as described.

In testimony whereof I have signed my name to this specification in presence of two subscribing witnesses.

GEORGE S. NEELEY.

Witnesses:
ALFRED A. EICKS,
M. G. IRION.